(12) United States Patent  
Adler et al.

(10) Patent No.: US 6,603,573 B1  
(45) Date of Patent: Aug. 5, 2003

(54) CONSTRAINED DIGITAL HALFTONING

(75) Inventors: Roy L. Adler, Chappaqua, NY (US); Marco Martens, Chappaqua, NY (US); Joan L. Mitchell, Cortlandt Manor, NY (US); Nenad Rijavec, Longmont, CO (US); Robert H. Risch, Ossining, NY (US); Charles P. Tresser, Mamaroneck, NY (US); Chai W. Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/182,420

(22) Filed: Oct. 30, 1998

(51) Int. Cl.$^7$ .............................. H04N 1/52; H04N 1/60
(52) U.S. Cl. ...................... 358/1.9; 358/3.03; 358/3.06; 358/534; 358/518
(58) Field of Search ................................ 358/1.9, 3.03, 358/3.06, 3.05, 3.16, 534, 518

(56) References Cited

U.S. PATENT DOCUMENTS 5,739,917 A * 4/1998 Shu et al. .................. 358/3.06

* cited by examiner

Primary Examiner—Scott Rogers
(74) Attorney, Agent, or Firm—Whitham, Curtis & Christofferson, P.C.; Stephen C. Kaufman

(57) ABSTRACT

A method and apparatus for halftoning digital images renders color data subject to constraints on the number of colorants which can be deposited on a single pixel and constraints on consecutive pixels rendered with the same color. The color data to be rendered is mapped into a second data set in an achievable color gamut space. Then, using a digital halftoning method in the achievable color gamut space, the second data set is rendered, so that the constraints are satisfied.

40 Claims, 6 Drawing Sheets

GAMUT REDUCTION MAPPING F RESTRICTED TO A FACE OF Q: GREY LEVEL CURVES ON THE SQUARE AT LEFT ARE MAPPED TO SIMILAR GREY LEVEL CURVES ON THE IMAGE TRIANGLE, A FACE OF G0, AT RIGHT. THE RAY P IS MAP TO P' BY THE MAP.

THE RAY P IS MAPPED ONTO THE RAY P'. THE BLACK DOTS INDICATE
INTERSECTION POINTS WITH FACES OF EITHER Q OR G0.

CONSTRAINED DIGITAL HALFTONING

BACKGROUND OF THE INVENTION

1. Field of the Invention

The present invention generally relates to color halftoning techniques for printers and facsimile machines and, more particularly, to a method and apparatus for halftoning for color printing with the constraint that all elementary colors may not be printed at the same spot and/or that the bandwidth to the printer requires a constraint on the colors printed at the same spot and subsequent spots.

2. Background Description

Digital halftoning is a technique for printing a picture (or more generally, displaying it on some two-dimensional medium) using small dots with a limited number of colors such that it appears to consist of many colors when viewed from a proper distance. For example, a picture of black and white dots can appear to display grey colors when viewed from some distance.

The fastest and most commonly used methods for digital halftoning are dithering algorithms which use threshold arrays, also called dither matrices or dither masks. Error diffusion, as first described in "An Adaptive Algorithm for Spatial Greyscale" by R. W. Floyd and L. Steinberg, *Proceeding of the SID* 17/2, (1976) pp. 75–77, is another popular technique for halftoning used today and is considered to be one of the best, and the best among the techniques with similar operating time. These techniques and others are reviewed in the book *Digital Halftoning*, MIT Press, Cambridge, Mass. (*1987*) by R. Ulichney, which is a general reference for digital halftoning.

The problem of digital halftoning has also to be considered for digital color printers, as well as various other digital color display devices. Both dithering and error diffusion methods have been adapted to color.

In the sequel, we will use the word "ink" to refer to any coloring substance such as ink or toner to be used by the printer and also to the color generation method in displays. Also, for definiteness, in the rest of this disclosure, we will assume colors are represented in the C, M, Y (cyan, magenta, yellow) space, although more general cases could be treated as well by the present invention. As is often the case in digital color printing, we assume first that at each pixel, the printer can either print:

white (or W, i.e., no ink is deposited),
cyan (or C),
magenta (or M),
yellow (or Y),
red (or R, i.e., M and Y are both printed),
green (or G, i.e., Y and C are both printed),
blue (or B, i.e., C and M are both printed), or
black (or K).

Depending on the printer, black is either a separate ink or consists of the superposition of C, M and Y.

A simple way of performing digital halftoning in color consists in separating the colors according to their C, M and Y components, and treating each component separately, either using a dithering method, an error diffusion method, or any other suitable monochromatic digital halftoning method. One has to take some precautions when doing this to avoid moire patterns. This, and other classical approaches to color halftoning is described for instance in "Color Technology for Electronic Imaging Devices" by Henry Kang, *SPIE Optical Engineering Press*, 1997 ISBN 0-8194-2108-1, which is a general reference for this subject.

Description of the Problem

Some printers have specific constraints (e.g., hardware constraints, software constraints, type of use, cost, etc.) which prevent the use of classical dithering methods for color images. We consider here the case of a digital printer with four inks, say C, M, Y, and K (black) for definiteness, such that the printer can only print at most one of these colors at each pixel. Thus, each pixel of the printed image has color either W, C, M, Y, or K. We call this restriction the single color constraint. An example of such a printer with this color constraint is a printer that has a ribbon with four color bands along the length of the ribbon. The command data stream allows the ribbon to be raised and lowered so that just one of the four bands is struck to print one of the four colors for each pixel.

This invention can easily be adapted to printers with other inks, for example, R (red), G (green) and B (blue) and even to the case when the color of the paper is not white. Such a printer with the single color constraint was discussed in U.S. Pat. No. 5,633,990 for "Method of Non-Overlapping Color Printing" issued to Edward M. Housel. In the Housel patent, a solution is disclosed for halftoning color images. This solution consists of halftoning each of the primary color planes and assigning a configuration of printed dots to each pixel in the halftoned image. This solution has several disadvantages, the main one of which is that a printing resolution higher than the image resolution is required. The presently disclosed method operates in a completely different way and can print at the same resolution as the image.

More generally, if there are ink activators for n elementary colors, say $A_1, A_2, \ldots, A_n$, it may be the case that the number of colors that can be printed at each pixel is smaller than n. We call this restriction the limited color constraint. Besides limited data transmission bandwidth, other reasons to accept and/or impose limited color constraints are printing technology, cost of inks and constraints on the amount of liquid and/or drying time that the paper can accommodate. Observe, that the limited color constraint reduces the gamut of the printer considerably.

We also consider the problem posed by printers such that the bandwidth to the guns (or other color activators) is so small that long sequences of pixels of the same color along a line are preferred to allow for more compact information streams. We call this restriction the long segments constraint. Anybody versed in the art would readily understand why these constraints can be imposed to satisfy low bandwidth in the transmission of instructions to the guns. In particular, long segments of pixels with the same color is especially amenable to run length encoding.

A typical case in which the invention applies are devices with low or variable bandwidth such as facsimile machines, where one likes to have draft modes for faster (and less costly) transmission.

The third problem the present invention addresses is the problem of misregistration. Misregistration refers to the fact that the coordinates (i,j) do not necessarily correspond to the same location for all color activators, due to mechanical imprecision of the printer. In low end printers, this misregistration can fluctuate too much for any reasonable solution. In more expensive machines, this misregistration can be stable during the printing of several images. For full color printers, such misregistration is easily compensated by translation of the origin in the printing decision matrices.

The printing decision matrices are the result of the halftoning process and are the arrays associated with each color activator, which tell where colors have to be printed.

The problem of misregistration of the color activators also occurs in printers with the limited color constraint. Under the single color constraint, or more generally under the limited color constraint, translation of the printing decision matrices cannot be used to compensate for misregistration as several color activators, more than allowed by the constraint, might need to print at the same coordinates (i,j). Consequently, another method has to be used to compensate for misregistration whenever a printer with the limited color constraint is used.

SUMMARY OF THE INVENTION

It is therefore an object of the present invention to provide a method that produces good approximations of full color images and solves the misregistration problem for printers with the above discussed constraints.

The constraints can be optionally enforced on all or parts of the image. Some reasons for imposing the constraints include limiting the amount of ink used, utilizing the apparatus in draft mode, improving compression of the halftoned image and local ink wetness control of the printed image.

For simplicity of the presentation, we will mostly discuss the case of single color constraint with color activators in the colors C, M, Y, and K. Anybody versed in the art of digital printing would readily understand how to adapt the invention to more general limited color constraints.

We denote by I the image to be printed. If the image has v columns and h rows of pixels, one can understand I as an h by v array of triples $$I_{(i,j)}=(C(i,j),M(i,j),Y(i,j)).$$

For each pixel (i,j) where i is between 1 and h, j is between 1 and v, the values $C(i,j),M(i,j),Y(i,j)$ in the triple $I_{(i,j)}$ are respectively the amount (which is a number normalized between 0 and 1) of the color C, M, and Y at pixel (i,j). In many cases, the $C(i,j),M(i,j)$ and $Y(i,j)$ values are given in the range of 0 to 255. The disclosed invention can be easily adapted to this case by means of simple normalization. The printed image P can be understood as an array of quadruples $$P_{(i,j)}=(c(i,j),m(i,j),y(i,j),k(i,j)).$$

For each pixel (i,j) where i is between 1 and h,j is between 1 and v, the values c(i,j), m(i,j), y(i,j), and k(i,j) (which are either 0 or 1) determine whether the color C, M, Y, and K is printed at pixel (i,j) respectively, with 0 meaning that the color is not printed, and 1 meaning that it is printed.

The single color constraint corresponds to the equation:

$$c(i,j)+m(i,j)+y(i,j)+k(i,j)=\text{either 0 or 1}.$$

According to the present invention, such an array P is computed for each array I using a digital halftoning method adapted to the constraint that at most a single ink can be deposited at each pixel and/or the long segments constraint. P is then considered as a new original image. Then, whenever one needs to print I, P is sent to the page formatting software or PostScript processor as if it were the original image I. Whichever method used by the page formatting software will then allow to print an image exactly corresponding to the specifications of the array P.

If the input image is of a lower resolution than the output image; e.g., 300 pixels per inch input and 600 pixels per inch output, then for every input pixel several output pixels may be printed (e.g., four output dots per input pixel). This scaling up of the input image could be done before any of the present invention's operations, but at the cost of additional CPU (central processor unit) cycles and bandwidth.

It may happen that the guns, or more generally the color activators, for the colors C, M, Y, and K are misregistered. If the defect of registration is fluctuating too much as in some low end printers, the best choice is possibly to ignore it. We assume that the misregistration only changes slowly and that the changes are measured, and that it has been rounded off to some integer number of pixels horizontally and vertically. With such misregistration information, when printing with a unconstrained full color printer, one can simply shift the printing decision matrices corresponding to each color so as to compensate for the misregistration. This simple solution cannot be used in the case of single color constraints as it could induce several guns to get a 1 (i.e., print) for the same (i,j). To overcome this difficulty, the shift will be made at the level of the image I. The image I is first decomposed into the colors $C(i,j),M(i,j),Y(i,j)$ and $K(i,j)$ according to any well known decomposition and then into the image T" by shifting the matrices $C(i,j),M(i,j),Y(i,j)$, and $K(i,j)$ accordingly to compensate for the misregistration. This results in a somewhat scrambled image I". Image I", after converting back to CMY space, is then halftoned using the disclosed method for halftoning images with a single color constraint. In the sequel, whenever we mention the matrix I, it may be either I, or I" in case misregistration has been compensated for. This procedure can be easily modified to compensate for other types of misregistration, such as the case where the pixels from the different color activators are rotated with respect to each other.

The digital halftoning of I will be done in two stages to take into account the constraints of the printer. The first stage compensates for the fact that, because only at most one of C, M, Y, and K can be printed at each pixel, the printable gamut will necessarily be seriously reduced. One thus begins by choosing a gamut reduction map F from the conventional full color unit cube spanned by C, M, and Y (denoted by $Q=[0,1]^3$) to a set of colors representing the gamut G of the printer, or just the gamut G0 corresponding to the single color constraint: one can then compute F(I), where all colors belong to the constructed color set representing G or G0. Then, some form of digital halftoning is used, so that the single color constraint is satisfied: one can either use some form of pseudo-mask method, i.e., a dither mask whose threshold values are interpreted according to the color to be printed, or a vector error diffusion method (both pseudo-masks and vector error diffusion will be explained in the sequel to the extent necessary for the present invention). Alternatively, one can choose a decomposition of the color pixels in F(I) into the components C, M, Y, K, and W and use an adapted form of error diffusion. Whenever an error diffusion approach is chosen, one can modify it by using some classical method in the prior art to better the results of error diffusion. It is clear that the halftoning method used cannot be simply decomposition into primary colors and halftoning each color plane independently since that might result in halftoned images violating the required constraints.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
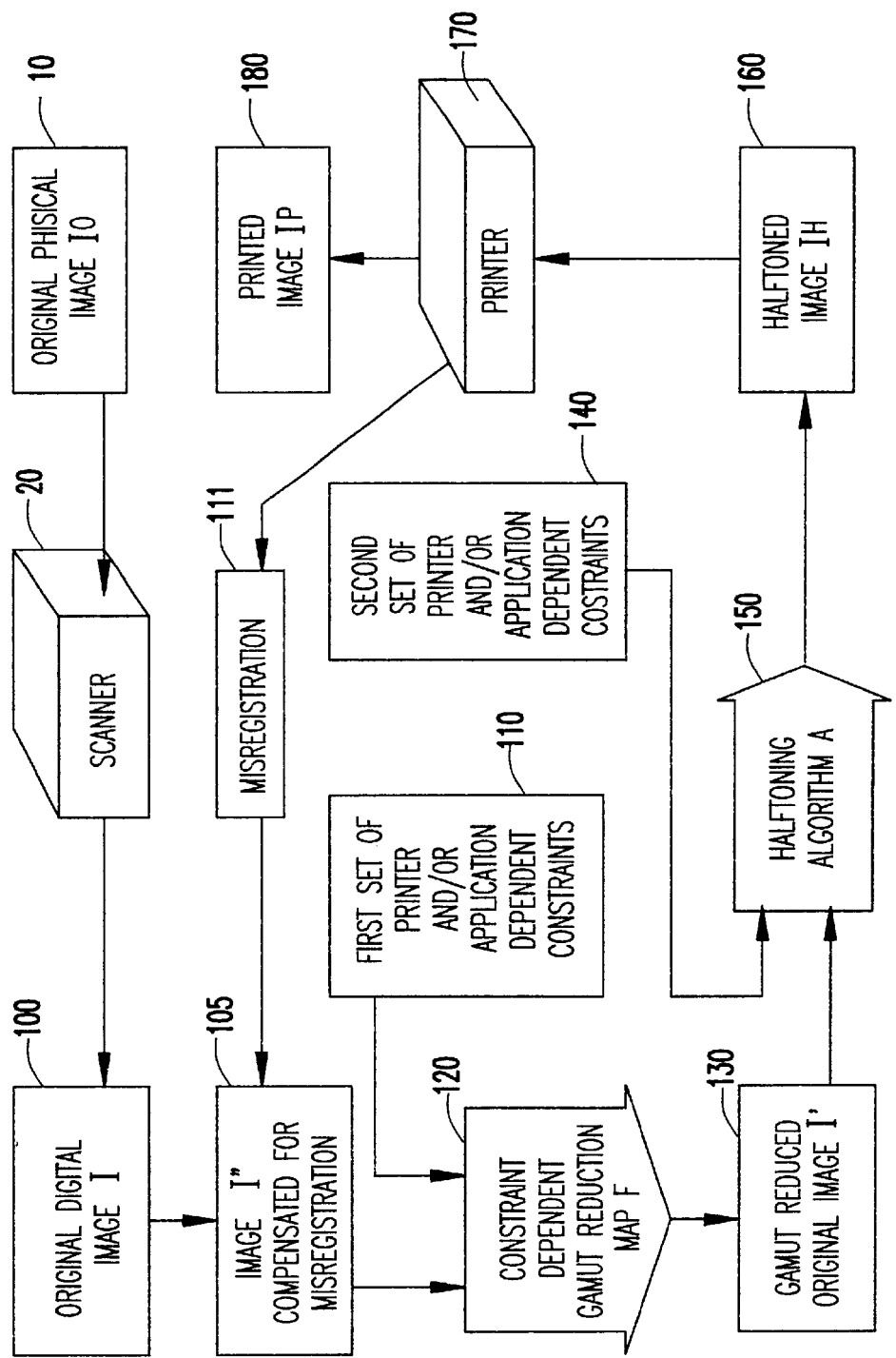
FIG. 1 is a block diagram illustrating the main steps in the practice of the invention.

Referring now to the drawings, and more particularly to FIG. 1, there is shown in block diagram form the data flow from the input image to the printer. More specifically, the input image I at 100 is either scanned by a scanner 20 from an actual physical image 10 or input in image storage by some other means. For the embodiment of the present invention which handles misregistration, the misregistration is read from the printer at 111, and the image I is modified to generate an image I" as described previously at 105. If there is no compensation for misregistration, I" is simply equal to I. Depending on a first set of constraints imposed by the printer 170 and/or by the application at 110, for example a limited color constraint, a constraint dependent gamut reduction map F at 120 is applied to the image I", to obtain gamut reduced original image I' at 130. Depending on a second set of constraints imposed by the printer and/or by the application at 140, for example a long segments constraint, a halftoning algorithm A at 150 is applied to the gamut reduced original image I', to obtain gamut reduced original image Ih at 160. Ih is then sent to the printer at 170, which prints the printed image Ip at 180. Notice that the first set of constraints 110 might be empty, in which case I'=I.

Figure 2:
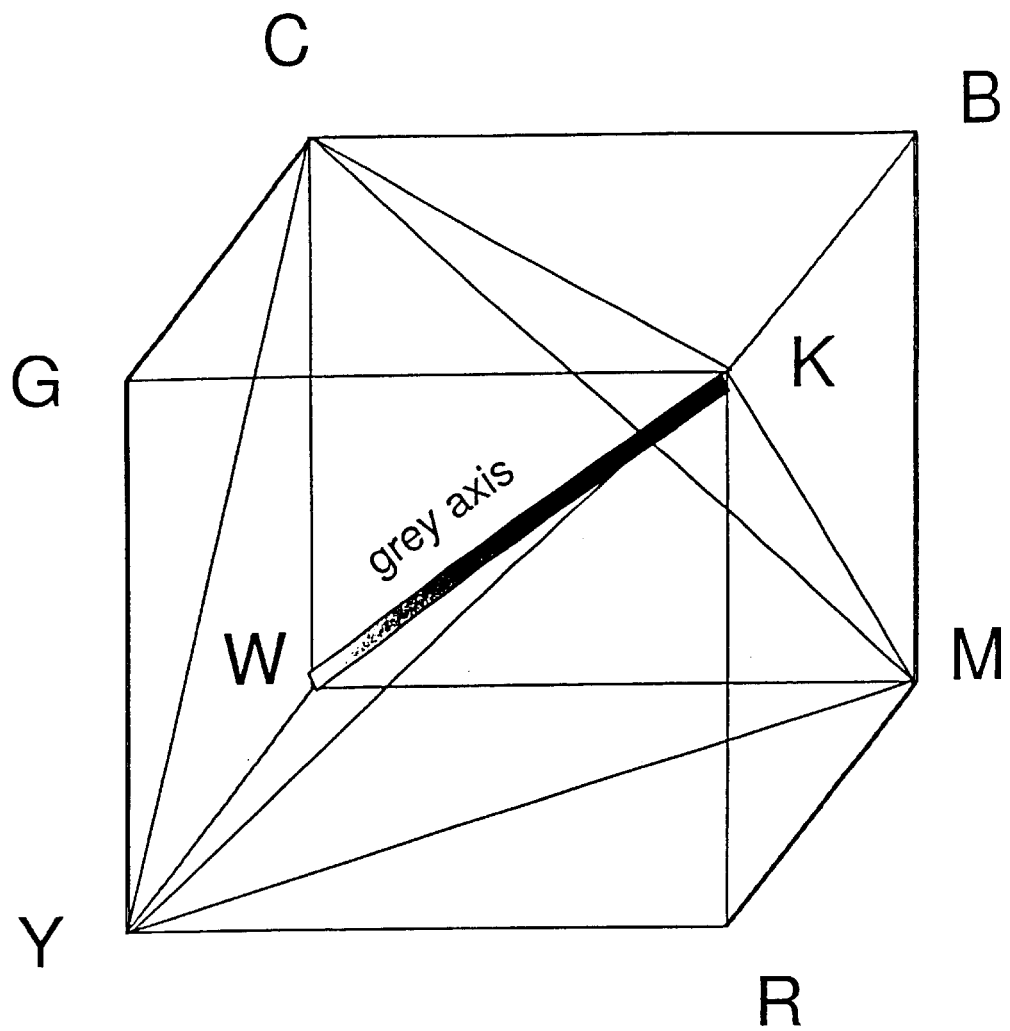
FIG. 2 is a three dimensional colorimetry diagram showing the color space H with the unit color cube Q containing the hexahedron G0 representing the feasible gamut under the one color constraint and also showing the grey axis.

In the embodiment with the single color constraint, the reduced gamut G0 is the hexahedron (polyhedron with six faces) with corners WCMYK represented in FIG. 2, where the grey axis, i.e., the segment between W and K, is also displayed. Notice that G0 is the union of the two tetrahedra WCMY and KCMY. Still in the case of a single color constraint, the actual gamut G of the printer may be bigger, and most likely different from G0. Either G or G0 can be used in the computation. The use of G imposes some calibration. We will first describe the case when G0 is used. We will describe modification to use G where appropriate.

There is an infinite number of distinct possible gamut reduction maps F. Here we describe a few gamut reduction maps. The first is from the color cube Q to the gamut G0. In this case we will use a halftone algorithm in the three-dimensional color space (either CMY or RGB) denoted by space H. The second transformation is into an unconventional four dimensional color space $X_4$, constructed to deal with the limited color constraint. In this case the halftone algorithm could be vector error-diffusion in $X_4$.

It is usually preferable to use infective maps as gamut reduction maps; i.e., maps which send distinct colors to distinct colors. Otherwise, there will be a loss of contrast caused by the gamut reduction map.

First we describe a map from Q to G0 which is obtained by deforming Q to G0 such that rays, $\{(tc,tm,ty)|t>0\}$, are preserved. Let (c,m,y) be a point in Q. For this point consider the intersection of the ray $\{(tc,tm,ty)|t>0\}$ corresponding to the color (c,m,y) with the boundary of G0, say $(\hat{c},\hat{m},\hat{y})$, and the intersection with the boundary of the color cube Q, say (C,M,Y). The gamut map from Q to G0 is such that the ray from (0,0,0) to (C,M,Y) is mapped onto the ray from (0,0,0) to $(\hat{c},\hat{m},\hat{y})$. Formally this map is described as follows. Let F(c,m,y)=(c',m',y') and max=(max(c,m,y)). Then (C,M,Y)=(c/max,m/max,y/max).

If c−m+y>=max, then c'(max/(c−m+y))·h(c/C)·C, m'=(max/(c−m+y))·h(m/M)·M, and y'=(max/(c−m+y))·h(y/Y)·Y.

If −c+m+y>=max, then c'=(max/(−c+m+y))·h(c/C)·C, m'=(max/(−c+m+y))·h(m/M)·M, and y'=(max/(−c+m+y))·h(y/Y)·Y.

If c+m−y>=max, then c'=(max/(c+m−y))·h(c/C)·C, m'=(max/(c+m−y))·h(m/M)·M, and y'=(max/(c+m−y))·h(y/Y)·Y.

Figure 3:
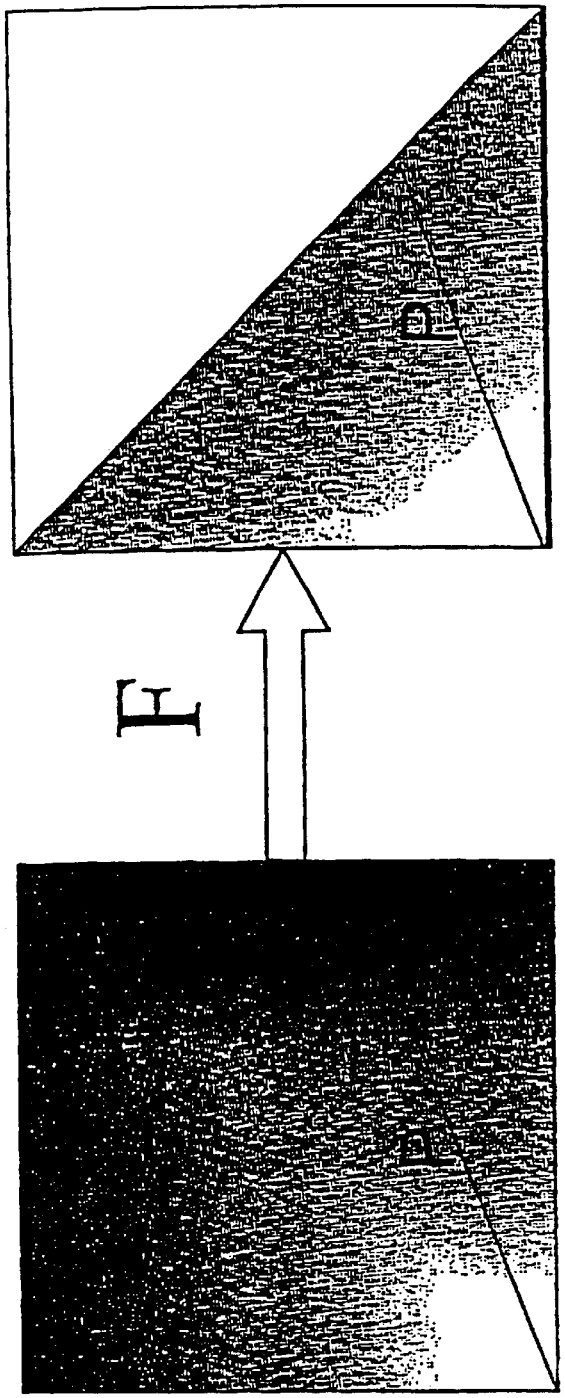
FIG. 3 is a two-dimensional colorimetry diagram illustrating the gamut reduction map from Q to G0 on a face of color cube Q.
Figure 4:
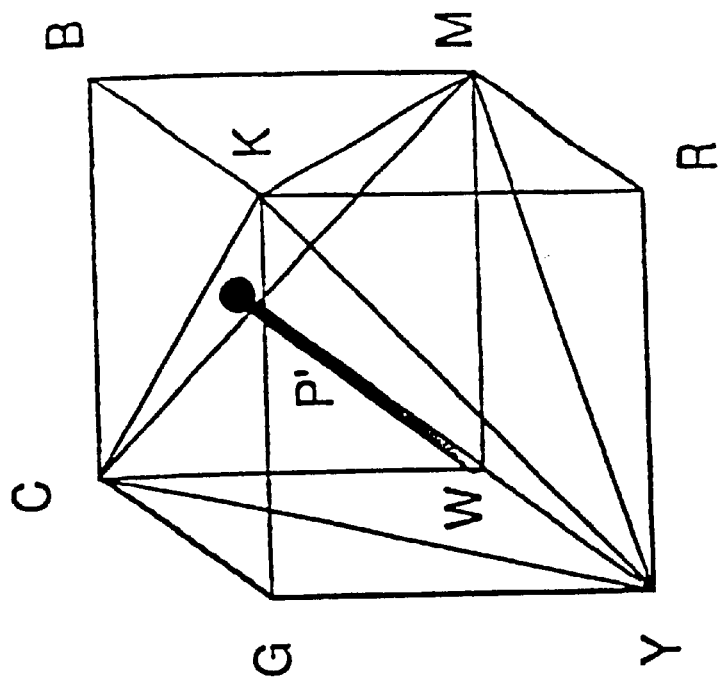
FIG. 4 are two three-dimensional colorimetry diagrams illustrating the gamut reduction map from color cube Q to G0.
Figure 4:
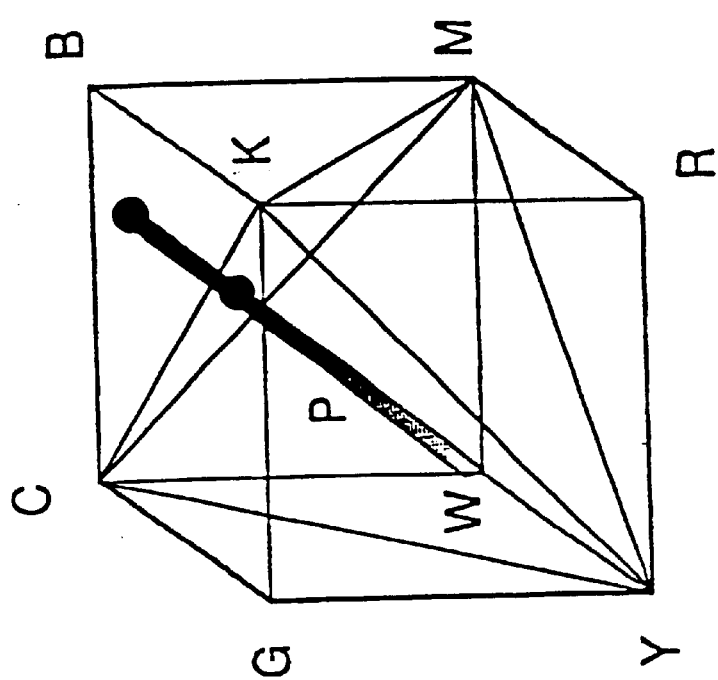

This map is illustrated in FIG. 3 for a face of cube Q and in FIG. 4 in general. The above described map depends on a nonlinear function h from [0,1] to [0,1] which satisfies h(0)=0 and h(1)=1. When h is chosen to be the identity function (i.e., h(x)=x) then the ray from (0,0,0) up to (C,M,Y) will be shrunk proportionally onto the ray from (0,0,0) to $(\hat{c},\hat{m},\hat{y})$. When h is chosen to be different from the identity function, then this ray from (0,0,0) to (C,M,Y) is not mapped proportionally onto the smaller ray from (0,0,0) to $(\hat{c},\hat{m},\hat{y})$. It is mapped in a nonlinear fashion.

The amount of nonlinear shrinking could depend on the picture under consideration (or a set of pictures under consideration). In particular, if the gamut of the picture is essentially contained in G0 then we can use very strong contraction on the part of the ray which is outside G0 and almost no contraction on the part of the ray which is inside the gamut G0. For example, function h could be chosen to look like the function shown in FIG. 6. More specifically we could let h depend on the average distance of the color pixels in the image to G0.

Figure 6:
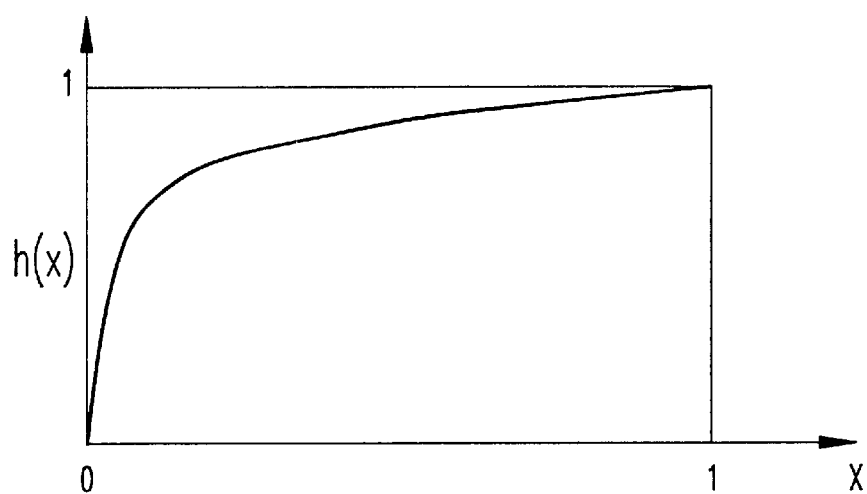
FIG. 6 is a graph showing a possible form for the function h.

A function h similar to FIG. 6 would be chosen for a small average distance. A function h close to the identity function would be chosen for a large average. The actual calibration will depend on various parameters. If G is convex, it is clear how this map can be modified to a map from Q to G.

Observe, that this gamut reduction map is injective: no unnecessary loss of contrast appears.

We will describe the reduction to $X_4$ in more details, as it is less obvious to get such a map with good results in printing.

The colors to be printed are represented by points (c,m,y) in the three dimensional unit cube $Q=[0,1]^3$, the conventional color space in the space G0. The printer under consideration is only able (or allowed) to print pixels of the form W,K,C,M, or Y. Another way to represent G0 is in the unconventional color space $X_4$ defined as the set of quintuples (w,c,m,y,k) of non negative numbers in [0,1] such that w+c+m+y+k=1; i.e., the unit simplex in $[0,1]^5$.

The first preferred reduced gamut map $F:Q \rightarrow X_4$ is defined as follows. Let F(c,m,y)=(w,k,c',m',y').

If c+m+y<=1, then w=1−(c+m+y), k=0, c'=c, m'=m, and y'=y.

If c+m+y>1, then w=0, k=h, c'=(1−h)·c/(c+m+y), m'=(1−h)·m/(c+m+y), and y'=(1−h)·y/(c+m+y), where $h=(1-(3-(c+m+y))/2)^a$, a>0.

Often, pictures obtained by error-diffusion turn out to be darker than expected. The parameter a allows to adjust the density of black. For a=1, black will be distributed proportionally. For a>1, the results are lighter. For a<1, the results will get darker. Observe, that when a does not equal 1 the distribution of black will not be proportional.

The following family of gamut maps $F_t$ is based on the previous gamut map: $F=F_1$. By decreasing t the resulting picture will be lighter, t is a positive number at most equal to 1. In this variation the amount of black is reduced proportionally.

If F(c,m,y)=(w,k,c',m',y'), then $F_t$(c,m,y)=(w+(1−t)k,tk,c',m',y').

The gamut map $F_t$ has the property that the pure colors (c,0,0), (0,y,0) and (0,0,m) are printed respectively with only c, m, and y. The segments from c,m,y to k are also (essentially) respectively printed with only c and k, only m and k, and only y and k. In this case, the grey axis (points with coordinates (x,x,x) 0≤x≤1) will be printed using the colors c, m and y. The following variation on F will be such that the grey axis is rendered using the colors, black and white. This new map F' coincides with F except on a thin cylinder around the grey axis. Let us fix the diameter of this cylinder to be 1/10. As long as this radius is chosen not to be too big (say less than 1/10) there will only be a weak dependence of the actual results on this choice.

Figure 7:
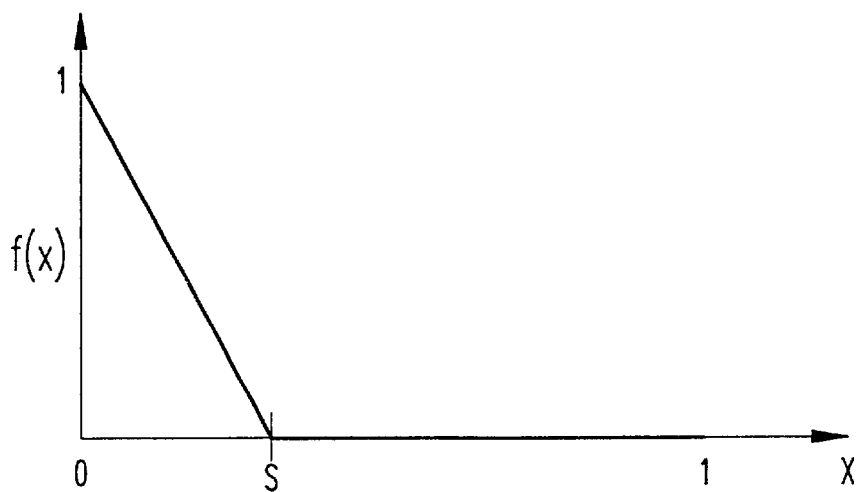
FIG. 7 is a graph showing a possible form for the function f.

Let f be a continuous function from [0,1] to [0,1] such that f(r)=0 for r>s and f(0)=1. For example, function f could be the piece-wise linear function shown in FIG. 7. Let r be the $L^1$ distance from (c/(c+m+y), m/(c+m+y), y/(c+m+y)) to (1/3,1/3,1/3). The grey adjusted transformation F is defined as follows. Let F(c,m,y)=(w,k,c',m',y') and F'(c,m,y)=(w',k',c", m",y").

If c+m+y<=1, then w'=w+f(r)(1−w)/2, and k'=f(r)(1−w)/2.

If c+m+y>1, then w'=f(r)(1−w)/2, and k'=k+f(r)(1−w)/2.

The colored part becomes c"(1−f(r))c', m"=(1−f(r))m', and y"=(1−f(r))y'.

Another variation on F, denoting it again as F'(c,m,y)=(w',k',c",m",y"), consists of applying the following transformation to (w,k,c',m',y')=F(c,m,y):

c"=c'−min(c',m',y'), m"=m'−min(c',m',y'), y"=y'−min(c',m',y'), k'=k+min(c',m',y'), and w'=1−(k'+c"+m"+y").

This will also print the grey axis using black and white pels.

We next describe some preferred halftoning algorithms A adapted for printers with the limited color constraint. More specifically, we will describe an H-adapted vector error diffusion, a $X_4$-adapted error diffusion, and an H-adapted pseudo-mask. To simplify the overall presentation of the invention, we will comment, when we present them, on how the error diffusion algorithms need to be adapted to also satisfy the long segments constraint.

We will assume some familiarity with classical dithering methods and error diffusion as described in the cited literature. Notice also that classical vector error diffusion methods in the color cube Q are described for instance in "Selection and Use of Small Color Sets for Pictorial Display", *Proc IS&T Annual Meeting*, Rochester 1990 by D. Venable et al., and "Color Halftoning Using Error Diffusion and a Human Visual System Model", *Proc IS&T Annual Meeting*, Rochester 1990, by R. Miller et al.

Also, previously disclosed improvements to error diffusion, such as described in "Digital Halftoning on the IBM 4250 Printer", *IBM J. of Res. and Dev.*, Vol. 31, no. 1, by G. Goertzel and G. R. Thompson can readily be adopted to improve the image so that their description need not be included here.

H-adapted and $X_4$-adapted Vector Error Diffusion

The vector error diffusion algorithm processes the pixels in some sequential order. The most common order scans from left to right, row by row starting from the top left corner of the image. The algorithm assigns to each pixel position the color that is to be deposited, and the corresponding error at that position.

At each pixel (i,j), the input color I'(i,j) is corrected by the weighted error vectors E((i,j)+v) from some selected neighbors (i,j)+v, where the vector v belongs to a selected set S (S usually contains (−1,0), (−1,−1), (0,−1), (1,−1), and possibly more vectors). More precisely, denoting by w(v) the weight of the error at (i,j)+v, we first compute the corrected input:

I'c(i,j)=I'(i,j)+$\Sigma_{v in S}$w(v)·E((i,j)+v).

Figure 5:
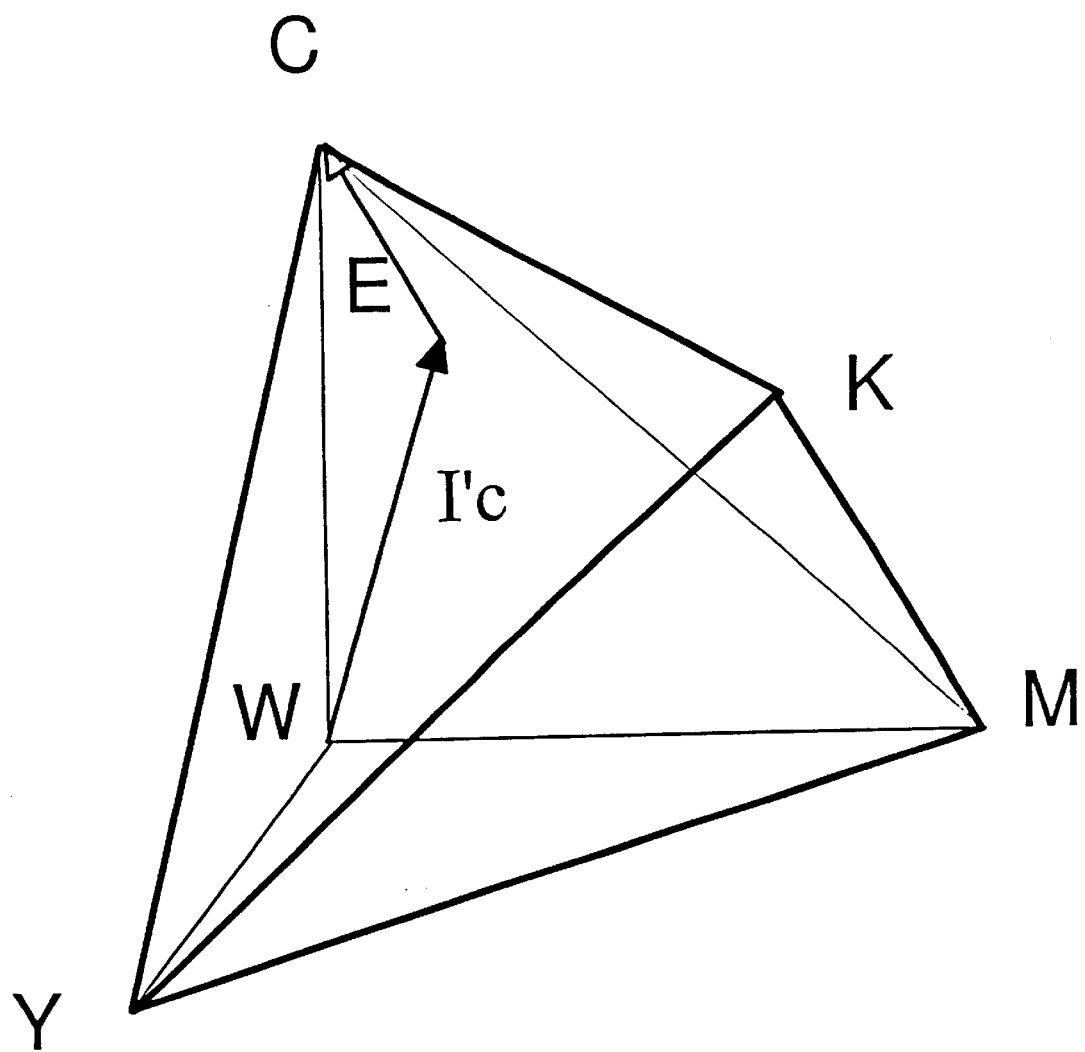
FIG. 5 is a vector diagram illustrating vector error diffusion in space H.

One then chooses the corner W,C,M,Y, or K of the space H (respectively of $X_4$) which is closer to I'c(i,j). To take account of the long segments constraints, one modifies the distance in the space H (respectively in the space $X_4$) so as to make the distance closer to the color which has been chosen at (i−1,j) and/or (i,j−1) depending on whether the matrix is transmitted column by column or row by row. The error vector E at (i,j) is defined as the vector from I'c(i,j) to the chosen corner in the space H (respectively the space $X_4$). This is illustrated in the space H in FIG. 5, where C is the chosen corner. The color of the chosen corner is then printed at the current pixel. This defines completely the algorithm, except for the cases when (i,j)+v is out of the range of the image. Then one can equivalently define a smaller set S, or set all errors equal to zero out of the image.

H-adapted Pseudo-masks

Let $C_i$, i=1,2, 3, . . . be the set of colors, including white (for no ink) that can be rendered on a pixel. Let $V_i$ be the amount of color $C_i$ that needs to be deposited on a pixel p, defined so that $\Sigma_i V_i=1$. We then partition the interval $[0,1)$ into subsets $S_i$, with each subset $S_i$ corresponding to $C_i$. In particular, for simplicity, these subsets can be connected subsets; i.e., subintervals of $[0,1)$. In the preferred embodiment, this is done as follows. The colors $C_i$ are ordered according to some criteria, for example in ascending luminance value. This ordering is especially important (i.e., the resulting print can depend strongly on the ordering) when clustered dither masks are used. Then we define the sets $$S_i[V_0+V_1+\ldots V_{i-1}, V_0+V_1+\ldots V_i) \text{ where } V_0=0.$$

Given a dither mask, let d be the dither mask value corresponding to the pixel p normalized to be within the interval $[0,1)$. If d lies in the subset corresponding to $C_i$, then $C_i$ is printed at pixel p. Notice that, although the mask is pixel value independent, the way the printing decision is taken is pixel value dependent. U.S. Pat. No. 5,657,137 to Perumal, Jr. et al. teaches a way to construct a pseudo-mask algorithm using a blue noise mask for full color printers which is a special case of the above description. In Perumal, Jr. et al., the $C_i$s are either colors printable by a single color activator or combinations thereof. Such an algorithm can be used to halftone the gamut reduced image I' after being adapted as follows: only colors $C_i$ which can be individually printed by the color activators are involved. Even when so adapted to the single color constraint, such blue noise masks cannot accommodate the long segments constraint. However, using for instance the invention disclosed in "Clustered Aperiodic Mask" by G. R. Thompson et al., U.S. Pat. No. 5,917,951, one can easily construct a mask such that the associated pseudo-mask algorithm satisfies the long segment constraint, but error diffusion as described above is used in the preferred embodiment.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method to render color data with a restriction that, of a full set of rendering colors which can individually be used in a pixel, any plurality of said colors cannot be used, in the same pixel comprising the steps of:
   mapping the color data to be rendered into a second data set in an achievable color gamut space; and
   using a digital halftoning method in the achievable color gamut space to render said second data set, so that said restriction is satisfied.

2. The method recited in claim 1 further comprising the step of sending the rendered color data to the printer as an image to be printed.

3. The method recited in claim 1 wherein said restriction is optionally imposed on parts of the data.

4. The method recited in claim 1 wherein said restriction is used for local ink wetness control.

5. The method recited in claim 1 further comprising the step of transmitting the rendered color data to a facsimile machine as an image.

6. The method recited in claim 1 further comprising the step of sending the rendered color data to a display as an image to be displayed.

7. The method recited in claim 1 where said halftoning method is vector error diffusion.

8. The method recited in claim 7 where said error diffusion method is modified such that consecutive pixels of the same color occur more often than dictated by the color to be printed.

9. The method recited in claim 8 where said error diffusion method is modified such that the distance to the previously printed color is decreased.

10. The method recited in claim 1 where said second data set is converted into a high-dimensional space where each dimension corresponds to a printable color.

11. The method recited in claim 10 where said halftoning method is vector error diffusion in said high-dimensional space.

12. The method recited in claim 11 where said vector error diffusion method is modified such that consecutive pixels of the same color occur more often than dictated by the color to be printed.

13. The method recited in claim 12 where said vector error diffusion method is modified such that the distance to the previously printed color is decreased.

14. The method recited in claim 1 where said halftoning method is a pseudo mask method.

15. The method recited in claim 1 further comprising the step of correcting for misregistration.

16. The method recited in claim 15 where said step of correcting for misregistration is made by pre-processing the image to be treated, before gamut reduction and halftoning, so as to compensate for the misregistration.

17. The method recited in claim 1 where said mapping comprises of mapping each image pixel through a gamut reduction map, said gamut reduction map mapping each ray through the origin in the full color gamut space onto a ray through the origin in the achievable color gamut space.

18. A method to render color data comprising the steps of:
   mapping each image pixel of the color data through a gamut map into a second data set where said gamut map maps each ray through an origin in a full color gamut space onto a ray through the origin in an achievable color gamut space; and
   using a digital halftoning method in the achievable color gamut space to render said second data set.

19. The method recited in claim 18 where the halftoning method is a vector error diffusion.

20. The method recited in claim 18 where the halftoning method is a pseudo mask method.

21. The method recited in claim 18 further comprising the step of correcting for misregistration.

22. An apparatus to render color data with a restriction that, of a full set of rendering colors which can individually be used in a pixel, any plurality of said colors cannot be used in the same pixel, said apparatus comprising:
   mapping means for mapping the color data to be rendered into a second data set in an achievable color gamut space; and rendering means using a digital halftoning method in the achievable color gamut space for rendering said second data set, so that said restriction is satisfied.

23. The apparatus recited in claim 22 further comprising means for sending the rendered color data to a printer as an image to be printed.

24. The apparatus recited in claim 22 further comprising means for transmitting the rendered color data to a facsimile machine as an image.

25. The apparatus recited in claim 22 further comprising means for sending the rendered color data to a display as an image to be displayed.

26. The apparatus recited in claim 22 where said halftoning method is vector error diffusion.

27. The apparatus recited in claim 26 where said error diffusion method is modified such that consecutive pixels of the same color occur more often than dictated by the color to be printed.

28. The apparatus recited in claim 27 where said error diffusion method is modified such that the distance to the previously printed color is decreased.

29. The apparatus recited in claim 22 further comprising conversion means for converting said second data set into a high-dimensional space where each dimension corresponds to a printable color.

30. The apparatus recited in claim 22 where said halftoning method is vector error diffusion in said high-dimensional space.

31. The apparatus recited in claim 26 where said vector error diffusion method is modified such that consecutive pixels of the same color occur more often than dictated by the color to be printed.

32. The apparatus recited in claim 31 where said vector error diffusion method is modified such that the distance to the previously printed color is decreased.

33. The apparatus recited in claim 22 where said halftoning method is a pseudo mask method.

34. The apparatus recited in claim 22 further comprising means for correcting for misregistration.

35. The apparatus recited in claim 34 where said means for correcting for misregistration includes pre-processing means for treating the image, before gamut reduction and halftoning, so as to compensate for the misregistration.

36. The apparatus recited in claim 22 wherein said mapping means maps each image pixel through a gamut reduction map, said gamut reduction map mapping each ray through the origin in the full color gamut space onto a ray through the origin in the achievable color gamut space.

37. An apparatus for rendering color data comprising:
mapping means for mapping each image pixel of the color data through a gamut map into a second data set where said gamut map maps each ray through an origin in a full color gamut space onto a ray through the origin in an achievable color gamut space; and
rendering means using a digital halftoning method in the achievable color gamut space to render said second data set.

38. The apparatus recited in claim 37 where the halftoning method is a vector error diffusion.

39. The apparatus recited in claim 37 where the halftoning method is a pseudo mask method.

40. The apparatus recited in claim 37 further comprising the step of correcting for misregistration.

* * * * *